US 7,634,457 B2

(12) United States Patent
Lawande

(10) Patent No.: US 7,634,457 B2
(45) Date of Patent: Dec. 15, 2009

(54) FUNCTION-BASED INDEX TUNING FOR QUERIES WITH EXPRESSIONS

(75) Inventor: Shilpa S. Lawande, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 355 days.

(21) Appl. No.: 11/287,622

(22) Filed: Nov. 28, 2005

(65) Prior Publication Data

US 2007/0083483 A1   Apr. 12, 2007

Related U.S. Application Data

(60) Provisional application No. 60/724,984, filed on Oct. 7, 2005.

(51) Int. Cl.
*G06F 7/00* (2006.01)
*G06F 17/30* (2006.01)

(52) U.S. Cl. ............................................. 707/2; 707/3

(58) Field of Classification Search ............ 707/2, 707/3, 4, 10; 709/104, 106
See application file for complete search history.

(56) References Cited

U.S. PATENT DOCUMENTS

| 5,960,423 | A  | * | 9/1999 | Chaudhuri et al. ............. 707/2 |
| 6,356,889 | B1 | * | 3/2002 | Lohman et al. ................ 707/2 |
| 6,513,029 | B1 |   | 1/2003 | Agrawal et al. |
| 6,721,747 | B2 |   | 4/2004 | Lipkin |
| 2002/0073236 | A1 | | 6/2002 | Helgeson et al. |
| 2003/0093408 | A1 | | 5/2003 | Brown et al. |
| 2003/0182282 | A1 | | 9/2003 | Ripley |
| 2005/0125427 | A1 | | 6/2005 | Dageville et al. |
| 2005/0256835 | A1 | * | 11/2005 | Jenkins et al. ................. 707/1 |

OTHER PUBLICATIONS

Ramakrishnan et al., "Database Management Systems", Third Edition, McGraw-Hill, 2003.*
Chaudhuri, "An Overview of Query Optimization in Relational Systems" Proceedings of the Seventeenth ACM SIGACT-SIGMOD-SIGART Symposium on Principles of Database Systems, pp. 34-43; Seattle, Wa; 1998; ACM.*
DBAsupport.com, http://www.DBAsupport.com/http://www.dbasupport.com/oracle/ora8/fbi.shtml, Accessed Sep. 26, 2007, Jupitermedia Co. 2007.*
Chong et al., "An Efficient SQL Based RDF Querying Scheme", Proceedings of the 31st international conference on Very large databases 2005, pp. 1216-1227, Aug. 30-Sep. 2, 2005, ACM.*
Hwang, "Function-Based Indexing for Object-Oriented Databases", MIT, 1994.*

(Continued)

*Primary Examiner*—Neveen Abel Jalil
*Assistant Examiner*—Michael J Hicks
(74) *Attorney, Agent, or Firm*—Kraguljac & Kalnay, LLC

(57) ABSTRACT

Systems, methods, and media associated with function-based index tuning for queries with expressions are described. One exemplary method includes receiving a query for which an index is to be recommended. The query may include an expression, thus the method may include identifying an expression in the query and generating a set of column statistics related to the expression. The method may also include identifying candidate function-based indexes associated with the query, generating a set of function-based index statistics related to the candidate function-based indexes, and recommending a candidate function-based index.

21 Claims, 5 Drawing Sheets

OTHER PUBLICATIONS

Kimberly Floss, Getting Good Advice About Access, (As Published in Oracle Magazine), Jul., Aug. 2004, pp. 1-4, Oracle Technology Network, Oracle Corp., Redwood Shores, CA.

USPTO Non-Final Office Action in co-pending U.S. Appl. No. 11/366,068, filed Mar. 2, 2006, having a mail date of Apr. 10, 2008.
USPTO Final Office Action in co-pending U.S. Appl. No. 11/366,068, filed Mar. 2, 2006 having a mailing date of Oct. 27, 2008.

* cited by examiner

FUNCTION-BASED INDEX TUNING FOR QUERIES WITH EXPRESSIONS

CROSS REFERENCE TO RELATED APPLICATIONS

This application claims the benefit of U.S. Provisional Application 60/724,984 filed Oct. 7, 2005.

BACKGROUND

A function-based index is not just an index on a typical database column. A function-based index is an index on a result of a function. The inputs to the function may come from one or more columns. For example, a function like to_upper (A) takes input from a single column while a function like equality(A,B,C) takes input from three columns. A function-based index computes a value for a function and then indexes off the computed value.

A query may include expressions to simplify query writing. For example, a database may store a text string representing a person's name in different formats. The name may be stored in upper case, lower case, mixed upper and lower, and so on. Rather than a query writer anticipating all the storage formats, a query writer may include an expression like to_upper(A) in their query to match a name like SMITH. However, the column to_upper(A) doesn't really exist. Members of the "column" may only exist during the execution of the query. Thus, data concerning the "column" may be difficult to acquire.

Database administrators constantly seek to improve database performance. One way to improve performance is to tune queries to improve query response time. Query response time may be improved by different techniques including, for example, optimizing queries, creating indexes, creating summaries, creating materialized views, rewriting queries to access summaries and/or materialized views, index tuning, and so on. Appropriate use of indexes can improve access paths to data and thus can improve query performance. For example, an appropriate index can enhance SQL (structured query language) statement performance by reducing the need for full table scans. However, indexes may be costly. Creating an index consumes processor cycles, storing an index consumes memory, and maintaining (e.g., updating) an index consumes processor cycles. Thus, a database administrator (dbadmin) may carefully consider which indexes to create, store, and/or maintain.

Making decisions concerning indexes is complicated by the realities of the database environment. For example, dbadmins may have limited resources (e.g., memory, time, processor cycles) available. Therefore a dbadmin may not be able to create an unlimited or even large number of indexes. By way of illustration, the dbadmin may not have enough memory to store all possible indexes that would improve query performance. Similarly, the dbadmin may not have enough processor cycles to maintain all possible indexes that would improve query performance. Thus, a dbadmin may be forced to select indexes to create and maintain.

Automated tools may help the dbadmin select indexes. Conventionally, an automated tool may generate candidate indexes from which a dbadmin may select. These automated tools may consider constraints including memory consumed, processor cycles consumed, query performance, and so on. The automated tools may make decisions based on statistics gathered concerning columns related to a query. In some cases the statistics may be gathered using dynamic sampling. Thus, less than an entire column may be used to generate statistics upon which an automated tool may make a decision. The decisions may also be based on statistics gathered concerning indexes used to resolve a query. Once again these statistics may be gathered using dynamic sampling and thus less than an entire index may be used to generated statistics.

Some statistics are straightforward to collect. For example, the number of columns in a table, the number of rows in a table, the number of times a value appears in a column, and so on are straightforward to collect. However, other statistics may not be so straightforward. For example, when a query includes an expression (e.g., to_upper( ), equals, in_range (start,end)), then the data upon which the statistics are based may only exist during the execution of the query when the expression is evaluated. These types of queries may be referred to as function-based queries or queries that include expressions. Since function-based queries may depend on columns that do not actually exist, function-based queries may complicate determining which indexes to employ to support a workload.

By way of illustration, a query may include an expression concerning the equality of members in two columns. Statistics about each of the two columns may be available. However, statistics about the virtual column—the equality of corresponding members of the two columns—may not exist. Yet it is these statistics that facilitate determining whether to create and/or maintain an index that supports the query. Similarly, an index may exist for each of the two columns. Once again, statistics may be collected for these existing indexes. Since the column represented by the function result does not exist, it is also likely that an index for the non-existent column does not exist. Thus, it may be difficult to acquire statistics for the non-existent index. This contributed to conventional tools not supporting index tuning for function-based indexes.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
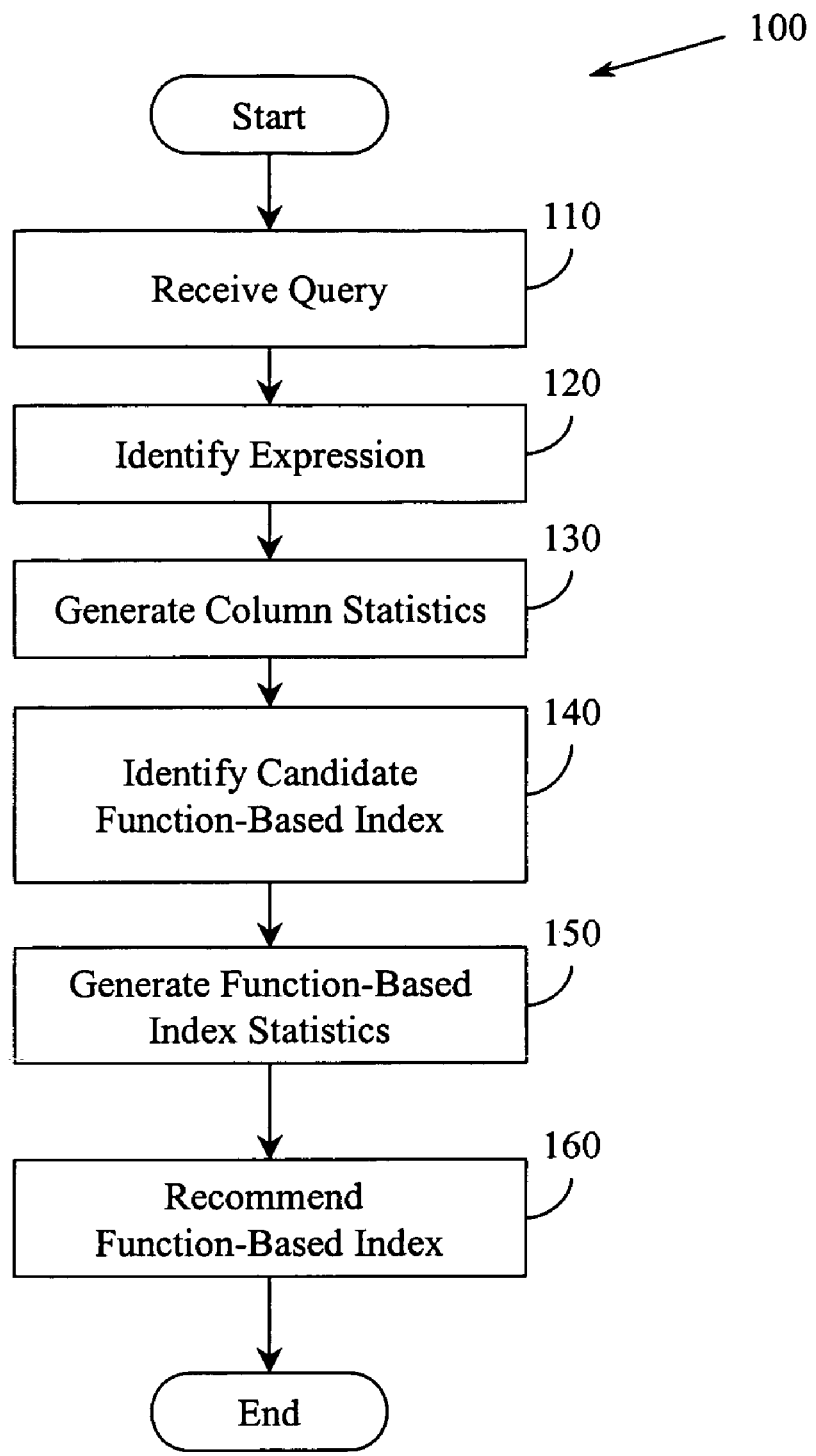
FIG. 1 illustrates an example method associated with function-based index tuning for queries with expressions.

Example systems and methods described herein concern function-based index tuning for queries with expressions. Conventionally, automated database tools have not been configured to recommend indexes for queries that included expressions instead of just column references. Generally, the fastest way to access a database is with an index. Thus, database performance for queries that include expressions has suffered.

Indexes may include, for example, bitmap indexes, b-tree indexes, and so on. An index includes an entry for each value that appears in an indexed column of a table and a pointer that provides direct access to a row(s) in that table. Good b-tree index performance may depend on building indexes on columns having good selectivity, which facilitates quickly bypassing rows that do not match search criteria. Good bitmap index performance may depend on building indexes on columns having poor selectivity. These differences facilitate understanding, at least in part, why index selection can be difficult and costly. Thus, the costs as well as the benefits of an index may need to be considered. Since the cost may be extremely high to create an index, example systems and methods facilitate predicting a cost and benefit for a function-based index without actually creating the function-based index.

Predicted costs and benefits may be evaluated in light of actual work performed on a database. This work may include responding to queries. A set of planned and/or available queries may be known for a database. Similarly, a set of ad hoc queries made against the database may be recorded. Additionally, database designers may have consulted with users and thus may anticipate the types of queries users may make. Therefore, a set of queries associated with a database may be known. The set of queries may be referred to as a workload. The costs and benefits of function-based indexes to improve database performance may be made in light of this workload. The workload may be actual and or hypothetical. A database may be accessed by different workloads at different times. Thus, index costs and benefits may be analyzed in light of different workloads available at different times.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read. Other forms may also be used.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic including an application specific integrated circuit (ASIC), an analog circuit, a digital circuit, a programmed logic device, a memory device containing instructions, and so on. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may depend, for example, on requirements of a desired application, on the environment in which it runs, and/or on the desires of a designer/programmer and so on. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein may be fabricated from programming languages and tools including Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

"User", as used herein, includes but is not limited to one or more persons, software, computers or other devices, or combinations of these.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional, not illustrated blocks. While the figures illustrate various actions occurring in serial, it is to be appreciated that various actions could occur concurrently, substantially in parallel, and/or at substantially different points in time.

Example systems and methods facilitate recommending a function-based index (e.g., b-tree index, bitmap index) to use with queries that include expressions. Example systems and methods employ dynamic sampling to estimate statistics for a candidate index. The statistics may include, for example, the number of blocks in an index, the number of levels in an index, the number of keys per page on average, and so on. The statistics may be gathered without actually creating the index. Example systems and methods may also employ dynamic sampling to estimate statistics for a column produced as the result of an expression. These statistics may include, for example, the number of rows in the column, how many distinct values appear in the column, how many times a certain value appears in the column, and so on. These statistics may then be employed with the index statistics to estimate a cost and/or benefit of a function-based index without actually creating the function-based index.

FIG. 1 illustrates an example method 100 associated with function-based index tuning for queries with expressions. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methods can be implemented as processor executable instructions and/or operations provided by a computer-readable medium. In another example, the processing blocks may represent functions and/or actions performed by functionally equivalent circuits including an analog circuit, a digital signal processor circuit, an application specific integrated circuit (ASIC), or other logic device.

It will be appreciated that electronic and software applications may involve dynamic and flexible processes. Thus, illustrated blocks may be performed in sequences different than the one shown and/or blocks may be combined or separated into multiple components. Blocks may also be performed concurrently, substantially in parallel, and/or at substantially different points in time.

FIG. 1 illustrates a method 100 associated with function-based index tuning for queries with expressions. Method 100 may include, at 110, receiving a query for which an index(es) is to be recommended. The query may be an SQL query and may include an expression(s). Method 100 may ultimately recommend a function-based index to support the query. The function-based index may take forms including a b-tree index, a bitmap index, and so on.

Method 100 may also include, at 120, identifying an expression in the query. The expression may be, for example, a to_upper( ) expression, a mathematical expression (e.g., $A=B+C$), a logical expression (e.g., $A<B$?), and so on. Thus, a column may not exist in a database for the result of the expression. Therefore conventional methods may not have been able to acquire statistics concerning the non-existent column and thus may not have been able to evaluate the cost/benefit of a function-based index for the resulting column.

However, method 100 may include, at 130, generating a set of column statistics related to the expression. In one example, the set of column statistics may include a number of rows in a column, a number of distinct values in a column, and a number of times a specified value appears in a column. Rather than create the entire result column, dynamic sampling may be employed to generate initial statistics from which subsequent statistics may be extrapolated. Thus, portions of a "virtual" result column may temporarily be created to facilitate acquiring statistics concerning the result column.

Method 100 may also include, at 140, identifying a candidate function-based index(es) associated with the query. The candidate function-based index(es) may be identified from information available in the column statistics. For example the column statistics may indicate a retrieval pattern and/or hit rate that indicates that a b-tree index having a certain structure and contents should be considered. Similarly, the column statistics may indicate a coverage that indicates that a bitmap index having a certain size should be considered.

Method 100 may also include, at 150, generating a set of function-based index statistics related to the candidate function-based indexes identified at 140. In one example the function-based index statistics may include a number of blocks occupied by an index, a number of levels in an index, a number of pages occupied by an index, and a number of keys per page on average in the index. Generating the function-based index statistics may seem difficult because no function-based index has been created. However, at 140, information describing a candidate function-based index may have been generated. This information may include, for example, columns to be accessed, columns to be produced, expressions to be evaluated to populate a column, and so on. Thus, dynamic sampling can examine a subset of data that would be extracted from a database and/or examined in a database if the function-based index were to be created. Results from the dynamic sampling can be used to predict overall statistics for the index.

Method 100 may also include, at 160, recommending a candidate function-based index based, at least in part, on the set of function-based index statistics generated at 150. The recommendation may be made, for example, by a cost-based optimizer that receives as inputs the statistics generated at 150 and/or 130. In another example, the recommendation may be made based on cost/benefit analysis performed on the statistics generated at 150. For example, based on the statistics a benefit (e.g., improved query performance time) may be weighed against a cost (e.g., memory required to maintain) and a determination may be made whether the cost to benefit ratio satisfies a threshold for recommending an index. If multiple indexes satisfy the ratio, then a greedy algorithm may select the index with the lowest cost to benefit ratio. While a cost based optimizer and a greedy cost/benefit algorithm have been described, it is to be appreciated that other techniques may be employed to make the recommendation.

While FIG. 1 illustrates various actions occurring in serial, it is to be appreciated that various actions illustrated in FIG. 1 could occur substantially in parallel. By way of illustration, a first process could receive queries and identify expressions, a second process (e.g., dynamic sampling process) could generate column statistics and function-based index statistics, a third process could identify candidate function-based indexes, and a fourth process (e.g., cost based optimizer) could recommend function-based indexes. While four processes are described, it is to be appreciated that a greater and/or lesser number of processes could be employed and that lightweight processes, regular processes, threads, and other approaches could be employed.

In one example, methods are implemented as processor executable instructions and/or operations stored on a computer-readable medium. Thus, in one example, a computer-readable medium may store processor executable instructions operable to perform a method that includes receiving a query for which an index is to be recommended. The query may include an expression and thus the method may include identifying an expression in the query. The method may also include generating column statistics related to the expression and identifying candidate function-based indexes associated with the query based on the column statistics. The method may also include generating function-based index statistics related to the candidate function-based indexes and recommending a candidate function-based index based on the function-based index statistics. While the above method is described being stored on a computer-readable medium, it is to be appreciated that other example methods described herein can also be stored on a computer-readable medium.

Figure 2:
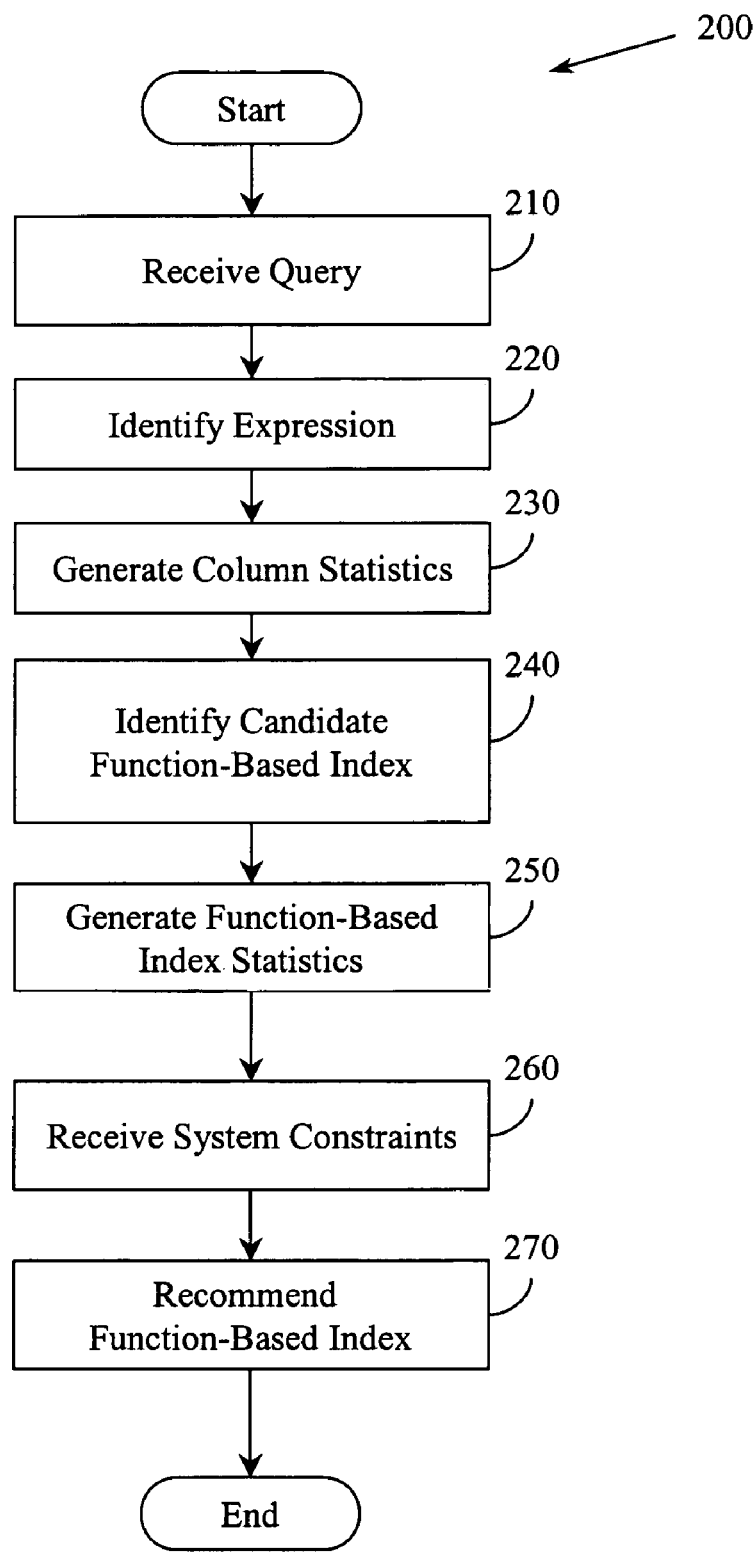
FIG. 2 illustrates another example method associated with function-based index tuning for queries with expressions.

FIG. 2 illustrates a method 200 associated with function-based index tuning for queries with expressions. Method 200 includes some actions similar to those described in connection with method 100 (FIG. 1). For example, method 200 includes, at 210, receiving a query, at 220, identifying an expression in the query, at 230, generating column statistics, at 240, identifying candidate function-based indexes, at 250, generating function-based index statistics, and at 270, recommending a function-based index.

However, method 200 may also include an additional action. Method 200 may include, at 260, receiving a set of system constraints concerning the indexes to be recommended. The system constraints may describe, for example, an amount of memory available to create an index, an amount of memory available to maintain an index, a number of cycles available to create an index, and a number of cycles available to maintain an index. Thus, while method 200 may include, at 270, recommending a function-based index, that recommendation may also be based, at least in part, on the system constraints. For example, a function-based index may be identified that would improve query performance by one percent. However, the index may consume fifty percent of the identified constrained system resources. Thus, this index may not be chosen. However, another index that might improve query performance by seventy percent and yet only consume one percent of the identified constrained system resources might be recommended. Thus, the system constraints may also be provided as inputs to a cost-based optimizer.

Figure 3:
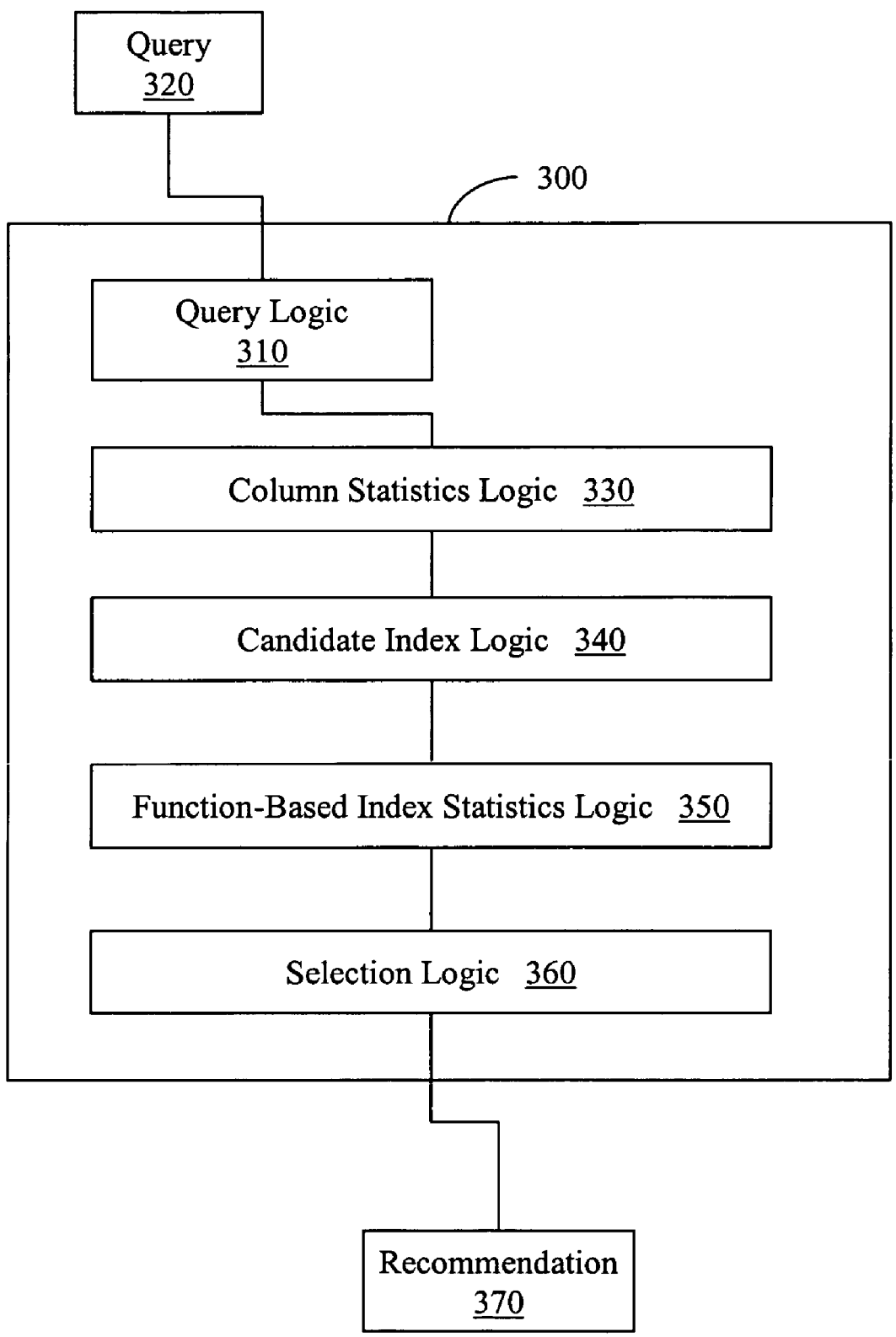
FIG. 3 illustrates an example system associated with function-based index tuning for queries with expressions.

FIG. 3 illustrates a system 300 associated with function-based index tuning for queries with expressions. System 300 may include a query logic 310 that is configured to receive a query 320 for which an index(es) is to be recommended. The query logic 310 may also be configured to identify an expression in query 320. Identifying the expression may include, for example, parsing query 320. Query 320 may be, for example, an SQL query.

System 300 may also include a column statistics logic 330 that is configured to identify column statistics associated with the expression. In one example the column statistics may include a number of rows in a column, a number of distinct values in a column, and/or a number of times a specified value appears in a column. While three example statistics are provided it is to be appreciated that other column statistics may also be employed. Scanning an entire column may be too time consuming and/or may consume too many resources. Thus, in one example, the column statistics may be collected by dynamically sampling a column(s) associated with the expression. It is to be appreciated that the "column" that is dynamically sampled may not actually exist in the database, and that elements of the column many temporarily exist as the result of evaluating an expression.

System 300 may also include a candidate-index logic 340 that is configured to identify candidate function-based indexes associated with query 320. In one example, a candidate function-based index may be selected based on the column statistics. For example, the column statistics may indicate that a query response time may be reduced when the index is available. Also, the column statistics may indicate that a certain type of index (e.g., b-tree, bitmap) is appropriate.

System 300 may also include a function-based index statistics logic 350 that is configured to generate a set of function-based index statistics related to the candidate function-based indexes. In one example the function-based index statistics may include a number of blocks occupied by an index, a number of levels in an index, and/or a number of keys per page on average in the index. While three sample statistics are provided, it is to be appreciated that other index statistics may also be employed. These statistics may be collected from a "virtual" index or a "model" of an index. Rather than actually creating an index, information concerning the index may be consulted and then dynamic sampling may be performed based on the information. For example, system 300 may know what columns would be examined to find values used in expressions in query 320. Thus, dynamic sampling may use this column information to create some sample expression results upon which analytics may be performed.

System 300 may also include a selection logic 360 that is configured to produce a recommendation 370 of a candidate function-based index. Recommendation 370 may be based, for example, on the function-based index statistics. By way of illustration, the function-based index statistics may indicate that a function-based index is likely to consume a small amount of memory yet provide a significant improvement in query performance. Thus, this index may be recommended.

Figure 4:
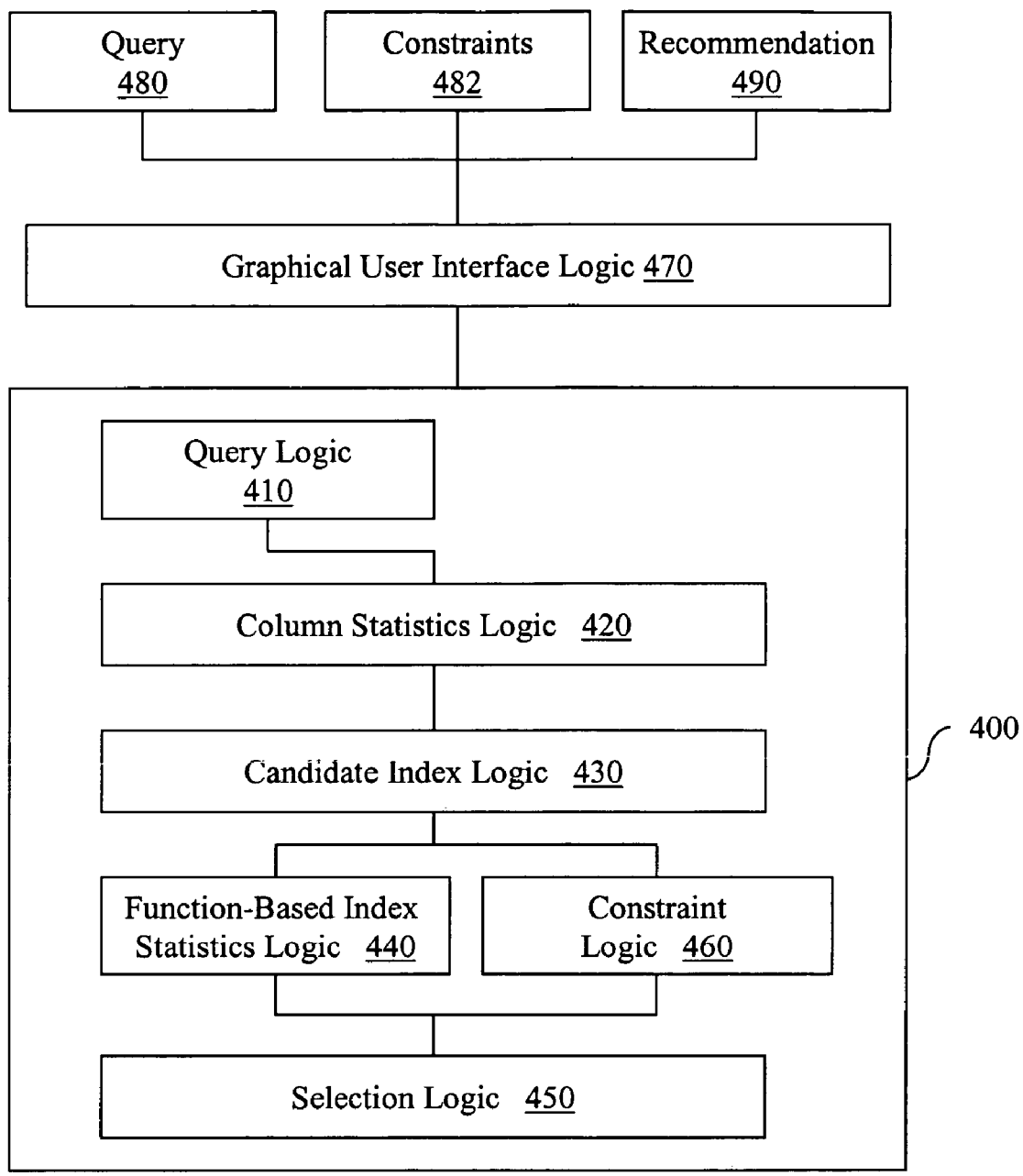
FIG. 4 illustrates another example system associated with function-based index tuning for queries with expressions.

FIG. 4 illustrates a system 400 associated with function-based index tuning for queries having expressions when system constraints are considered. System 400 includes elements like those associated with system 300 (FIG. 3). These elements may include a query logic 410, a column statistics logic 420, a candidate index logic 430, a function-based index statistics logic 440, and a selection logic 450. Similarly, system 400 may receive a query 480 and produce a recommendation 490. However, system 400 may include other elements and may receive other inputs.

For example, system 400 may also include a constraint logic 460 that is configured to receive a set of constraints 482. Constraints 482 may concern the indexes. Constraints 482 may include, for example, an amount of memory available to create an index, an amount of memory available to maintain an index, a number of cycles available to create an index, and/or a number of cycles available to maintain an index. With constraints 482 available, constraint logic 460 may control, at least in part, selection logic 450. For example, an index that might otherwise be recommended may be discarded based on input from constraint logic 460. By way of illustration, an index with an acceptable query performance improvement may not meet a resource consumption standard.

System 400 may also include a graphical user interface logic 470. Logic 470 may facilitate a user providing query 480 and/or constraints 482 and may in turn facilitate providing the user with recommendation 490.

Figure 5:
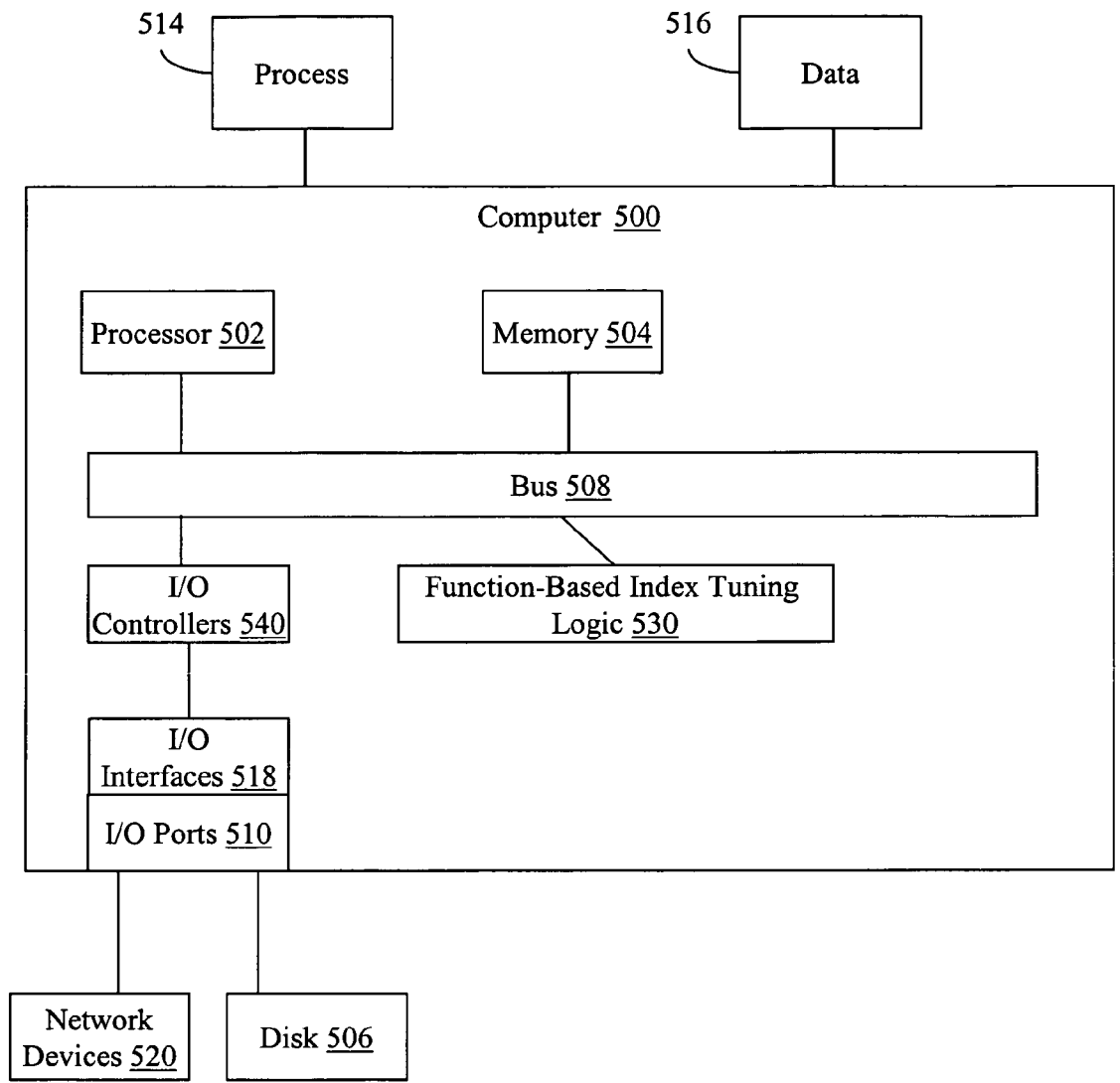
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, computer 500 may include a function-based index tuning logic 530 configured to facilitate selecting access structures to employ to support a workload. While function-based index tuning logic 530 is illustrated as a hardware component operably connected to bus 508, it is to be appreciated that in one example function-based index tuning logic 530 may be implemented as software stored on disk 506, brought into memory 504 as a process 514, and executed by processor 502.

Function-based index tuning logic 530 may provide means (e.g., hardware, software, firmware) for analyzing a virtual column associated with an expression in a query, means (e.g., hardware, software, firmware) for analyzing a virtual function-based index associated with an expression in the query, and means (e.g., hardware, software, firmware) for recommending a function-based index for the query. The virtual column may temporarily include the computed results of an expression and may be stored temporarily rather than being stored in an actual column in a database. Similarly, the virtual function-based index may be described by parameters including what values it would store, from where the values would be retrieved, what functions would be used to compute the values, and so on. However, the actual computations, creation, and storage may not occur. Rather, the information may be employed in dynamic sampling and thus a small percentage of the index may be created to facilitate subsequent analysis. This analysis may provide statistics for the means for recommending to decide between different virtual function-based indexes.

Generally describing an example configuration of computer 500, processor 502 can be a variety of various processors including dual microprocessor and other multi-processor architectures. Memory 504 can include volatile memory and/or non-volatile memory. The non-volatile memory can include, but is not limited to, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

Disk 506 may be operably connected to computer 500 via, for example, an input/output interface (e.g., card, device) 518 and an input/output port 510. Disk 506 can include, but is not limited to, devices like a magnetic disk drive, a solid state disk drive, a floppy disk drive, a tape drive, a Zip drive, a flash memory card, and/or a memory stick. Furthermore, disk 506 can include optical drives like a CD-ROM, a CD recordable drive (CD-R drive), a CD rewriteable drive (CD-RW drive), and/or a digital video ROM drive (DVD ROM). Memory 504 can store processes 514 and/or data 516, for example. Disk 506 and/or memory 504 can store an operating system that controls and allocates resources of computer 500.

Bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). Bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and so on. Input/output ports 510 can include but are not limited to, serial ports, parallel ports, and USB ports.

Computer 500 can operate in a network environment and thus may be connected to network devices 520 via the i/o devices 518, and/or the i/o ports 510. Through network devices 520, computer 500 may interact with a network. Through the network, computer 500 may be logically connected to remote computers. The networks with which computer 500 may interact include, but are not limited to, a local area network (LAN), a wide area network (WAN), and other networks. Network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, network devices 520 can connect to WAN technologies including, but not limited to, point to point links, circuit switching networks (e.g., integrated services digital networks (ISDN)), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methods for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method, comprising:
    receiving, by a computing device, a query for which one or more indexes are to be recommended, the query including one or more expressions;
    identifying, by the computing device, an expression in the query;
    generating, in the computing device, a set of column statistics related to the expression, and storing the set of column statistics in a memory;
    identifying one or more candidate function-based indexes associated with the query based, at least in part, on the set of column statistics;
    generating a set of function-based index statistics related to the one or more candidate function-based indexes; and
    recommending a candidate function-based index based, at least in part, on the set of function-based index statistics.

2. The method of claim 1, the query being a structured query language (SQL) query.

3. The method of claim 1, the candidate function-based indexes including one or more of, a b-tree index and a bitmap index.

4. The method of claim 1, the set of column statistics including one or more at a number of rows in a column, a number of distinct values in a column, and a number of times a specified value appears in a column.

5. The method of claim 1, where generating the set of column statistics includes dynamically sampling one or more columns in a database against which the query will be applied.

6. The method of claim 1, the set of function-based index statistics including one or more of, a number of blocks occupied by an index, a number of levels in an index, a number of pages occupied by an index, and a number of keys per page on average in the index.

7. The method of claim 1, where generating the set of function-based index statistics includes dynamically sampling a virtual candidate function-based index.

8. The method of claim, including receiving a set of system constraints concerning the one or more indexes to be recommended; and
    recommending one or more of the candidate function-based indexes based, at least in part, on the set of system constraints.

9. The method of claim 8, the set of system constraints including one or more of, an amount of memory available to create an index, an amount of memory available to maintain an index, a number of cycles available to create an index, and a number of cycles available to maintain an index.

10. A, computer-readable storage medium storing computer-executable instructions operable to cause a computing device to perform a method, the method, comprising:
    receiving a query for which one or more indexes are to be recommended, the query including one or more expressions;
    identifying an expression in the query;
    generating a set of column statistics related to the expression;
    identifying one or more candidate function-based indexes associated with the query based, at least in part, on the set of column statistics;
    generating a set of function-based index statistics related to the one or more candidate function-based indexes; and
    recommending a candidate function-based index based, at least in part, on the set of function-based index statistics.

11. A system, comprising:
    a query logic stored in a computer-readable storage medium and configured to receive a query for which one or more indexes are to be recommended and to identify an expression in the query;
    a column statistics logic configured to identify one or more column statistics associated with the expression;
    a candidate-index logic configured to identify one or more candidate function-based indexes associated with the query, a candidate function-based index being selected based, at least in part, on the one or more column statistics;
    a function-based index statistics logic configured to generate a set of function-based index statistics related to the one or more candidate function-based indexes; and
    a selection logic configured to recommend a candidate function-based index based, at least in part, on the set of function-based index statistics.

12. The system of claim 11, the system comprising a processor for executing instructions from at least the selection logic.

13. The system of claim 11, the column statistics including one or more of, a number of rows in a column, a number of distinct values in a column, and a number of times a specified value appears in a column.

14. The system of claim 11, the column statistics being produced by dynamically sampling a result column produced as the result of an expression in the query.

15. The system of claim 11, the function-based index statistics including one or more of, a number of blocks occupied by an index, a number of levels in an index, and a number of keys per page on average in the index.

16. The system of claim 11, the function-based index statistics being produced by dynamically sampling a virtual function-based index.

17. The system of claim 11, including a system constraint logic configured to receive a set of system constraints concerning the one or more indexes and to control, at least in part, the selection logic based, at least in part, on the set of system constraints.

18. The system of claim 17, the system constraints including one or more of, an amount of memory available to create an index, an amount of memory available to maintain an index, a number of cycles available to create an index, and a number of cycles available to maintain an index.

19. The system of claim 11, including a graphical user interface logic configured to provide a user with an interface for providing one or more of, the query, and system constraints, the graphical user interface logic also being configured to provide a user with the recommendation.

20. A system, comprising:
    means for analyzing a virtual column associated with an expression in a query, including generating, in a computing device, a set of column statistics related to the expression, and a memory for storing the set of column statistics;

means for analyzing a virtual function-based index associated with an expression in the query, and generating a set of function-based index statistics related to the virtual function-based index; and means for recommending a function-based index for the query based, at least in part, on the set of virtual function-based index statistics.

21. The system of claim 20 comprising at least one processor for executing instructions associated with the recommending.

\* \* \* \* \*

UNITED STATES PATENT AND TRADEMARK OFFICE
CERTIFICATE OF CORRECTION

PATENT NO. : 7,634,457 B2  Page 1 of 1
APPLICATION NO. : 11/287622
DATED : December 15, 2009
INVENTOR(S) : Shilpa S. Lawande It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 273 days.

In column 2, line 5, delete "generated" and insert -- generate --, therefor.

In column 8, line 10, delete "many" and insert -- may --, therefor.

In column 11, line 32, in claim 4, delete "at" and insert -- of, --, therefor.

In column 11, line 47, in claim 8, delete "claim ," and insert -- claim 1, --, therefor.

In column 11, line 59, in claim 10, delete "A," and insert -- A --, therefor.

In column 11, line 61, in claim 10, delete "method," and insert -- method --, therefor.

Signed and Sealed this

Fourteenth Day of September, 2010

David J. Kappos
*Director of the United States Patent and Trademark Office*